United States Patent [19]

Maxville et al.

[11] Patent Number: 4,897,928
[45] Date of Patent: Feb. 6, 1990

[54] HOLE ANGULARITY GAUGE

[75] Inventors: David C. Maxville, Seattle; Kenneth R. Meade, Sr., Bothell; David G. Beal, Kent, all of Wash.

[73] Assignee: The Boeing Company, Seattle, Wash.

[21] Appl. No.: 212,914

[22] Filed: Jun. 29, 1988

[51] Int. Cl.4 .............................................. G01B 5/24
[52] U.S. Cl. ........................................ 33/534; 33/1 N
[58] Field of Search ................. 33/534, 535, 509, 1 N, 33/178 F, 533, 148 R, 172 B, 172 R

[56] References Cited

U.S. PATENT DOCUMENTS

| | | | |
|---|---|---|---|
| 1,852,760 | 4/1932 | Sisson | 33/534 X |
| 2,527,758 | 10/1950 | Oslund | 33/534 X |
| 3,079,693 | 3/1963 | Miner | 33/172 B |
| 3,116,560 | 1/1964 | Mathews . | |
| 4,219,936 | 9/1980 | Bridges | 33/53 X |
| 4,338,723 | 7/1982 | Benjamin . | |
| 4,625,427 | 12/1986 | Rine . | |
| 4,638,566 | 1/1988 | Thompson . | |

Primary Examiner—Harry N. Haroian
Attorney, Agent, or Firm—Seed and Berry

[57] ABSTRACT

A hole angularity gauge is disclosed which is small, durable and easily calibrated. The gauge includes a probe which is sized to fit the hole to be measured. The probe is coupled to a lever, both of which are pivotal about a first pivot point whereby the lever is angularly displaced in response to any angular displacement of the probe. The gauge further includes a linkage asembly that amplifies the angular displacement of the lever. The linkage assembly includes a pointer which is adapted to pivot about a second pivot point. The pointer is coupled to the lever at a point that is displaced from the second pivot point such that the pointer is angularly displaced in response to any angular displacement of the lever whereby the angle that the pointer is displaced is a multiple of the angle that the lever is displaced. The probe further includes apparatus for indicating the angular displacement of the probe and, accordingly, indicating the angularity of the hole.

15 Claims, 3 Drawing Sheets

HOLE ANGULARITY GAUGE

DESCRIPTION

Technical Field

The present invention is directed toward hole angularity gauges and, more particularly, a compact hole angularity gauge which includes a novel linkage for amplifying the angularity measurement.

BACKGROUND OF THE INVENTION

The hole angularity measurement is one which attempts to determine the perpendicularity of the center line of a hole or bore with respect to a plane that is parallel to the hole surface. The measurement bears particular importance for holes which are used in combination with screws and other similar fasteners as an indication of the resultant strength of the fastened structure. It is therefore desirable to provide a device for accurately measuring the angularity of a hole or bore.

In some industries, such as the aircraft industry, where mass production is impractical, many holes must be manually drilled. To improve quality control, a hole angularity measurement is taken on manually drilled holes to insure the integrity of the resultant structure. Accordingly, it is desirable to have a device for accurate manual measurement of the angularity of a drilled hole or bore.

Further, due to required manufacturing processes and procedures in the aircraft industry, some holes must be drilled, and the hole angularity measurement made, in small somewhat confined areas. Therefore, it is desirable to provide a hole angularity gauge which is small in size so that it can readily access these small confined spaces.

Prior hole angularity gauges have failed to meet the foregoing requirements. Further, at least one prior hole angularity gauge has required the user to rotate the gauge while taking the measurement to accurately determine the angularity of the hole. It will be appreciated by those skilled in the art that the requirement to rotate the gauge will lead to measurement inaccuracies and detract from the overall usefulness of the instrument. It is therefore desirable to provide a hole angularity guage which is easy to use.

As always, it is desirable to provide measuring apparatus which is not only accurately and easily used but also durable and easily calibrated.

DISCLOSURE OF THE INVENTION

The present invention comprises apparatus for measuring the perpendicularity of a bore. The apparatus includes a probe assembly for sensing the perpendicularity of the bore. The probe assembly is pivotal about a first pivot point and includes a probe portion which extends outward from the first pivot point to engage the bore being measured. The apparatus further includes a linkage assembly for amplifying the angular displacement of the probe portions and for indicating the angular displacement of the bore centerline from the ideal centerline.

In a first embodiment of the invention, the linkage assembly includes a pointer which indicates the angular displacement of the bore centerline from the ideal centerline. The pointer is adapted to pivot about a second pivot point and is coupled to the probe assembly at a coupling point which is displaced from the second pivot. Accordingly, the pointer is angularly displaced by an angle which is a multiple of the angular displacement of the probe portion of the probe assembly.

In still a third embodiment of the invention, apparatus is provided for varying the distance between the coupling point and the second pivot point to vary the amplification of the linkage assembly and thereby calibrate the gauge.

BEST MODE FOR CARRYING OUT THE INVENTION

Figure 1:
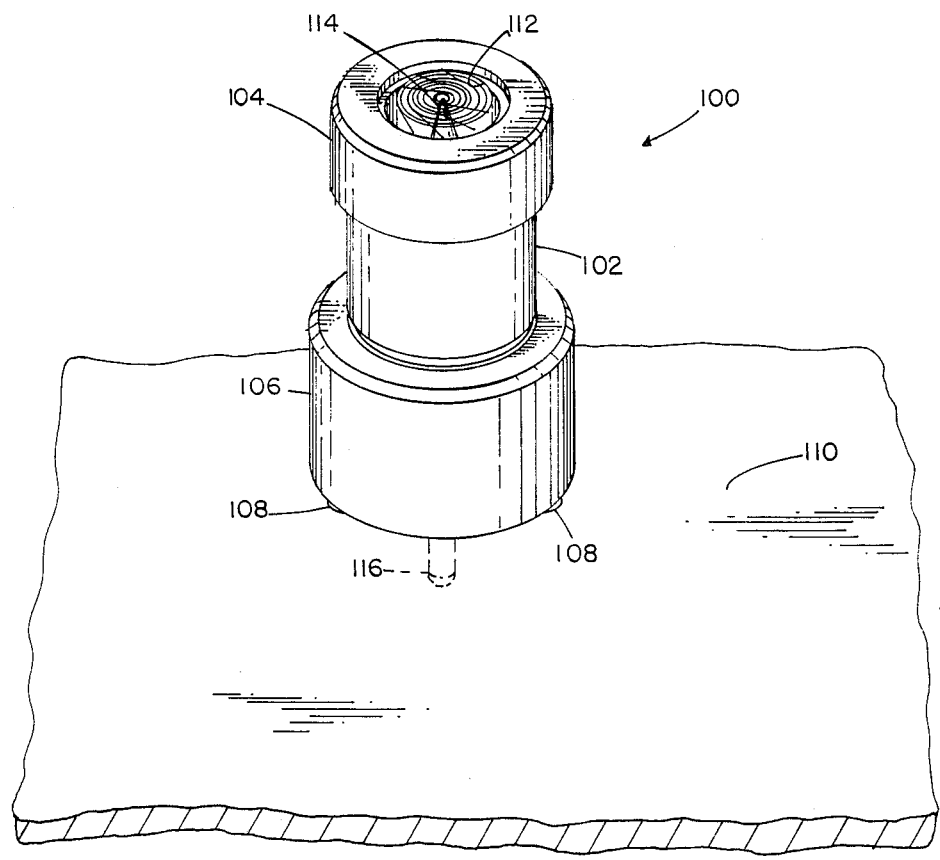
FIG. 1 is an isometric view of the hole angularity gauge which is the subject of the present invention.

An improved hole angularity gauge 100 is illustrated in FIG. 1. The hole angularity gauge includes a body 102, a scale retaining cap 104 and a base 106. The base 106 has a plurality of feet 108 extending therefrom for engaging a surface 110 wherein the hole to be measured is bored. The scale retaining cap 104 is provided for retaining a clear scale window 112 through which a cone shaped pointer 114 is visible. A probe 116 extends from the base portion 106 of the hole angularity gauge 100 to engage a hole within the surface 110.

In operation, the probe 116 is selected to match the diameter of the hole to be measured and is coupled to the hole angularity gauge 100 as will be described more fully below. The probe 116 is then inserted into the bore until the feet 108 of the hole angularity gauge 100 engage the surface 110. In response to any offset between the hole center line and a center line which is perpendicular to the plane of the hole surface (herein surface 110), the pointer 114 will be displaced. The operator of the hole angularity gauge 100 can then determine the degree of offset by reading the scale lines impressed upon the scale window 112 vis-a-vis the position of the pointer 114.

Figure 2:
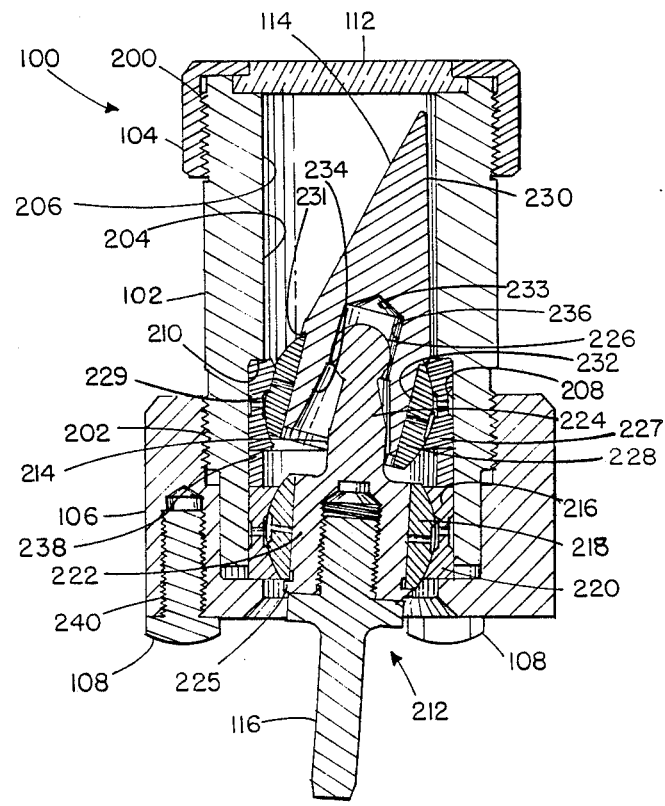
FIG. 2 is a sectional view of the hole angularity gauge illustrated in FIG. 1.

With respect to FIG. 2, wherein like elements have been given like reference numerals, it is seen that the body 102 comprises generally an upper portion 200 and a lower base receiving portion 202. The scale retaining cap 104 is threadably engageable with the upper portion 200 of the body 102. Similarly, the base 106 is threadably engageable with the base receiving portion 202 of the body. The body 102 includes an inner channel 204 which channel has a pointer portion 206 and a linkage receiving portion 208. The diameter of the pointer portion 206 is less than the diameter of the linkage receiving portion 208 such that an abutting lip 210 is created therebetween.

The probe 116 is threadably engaged to a linkage assembly 212. The linkage assembly 212 includes a lever 214 which is slidably inserted within a slidable radial bearing assembly 216. The slidable radial bearing assembly 216 comprises a hollow bearing 218 which is press-fit into a bearing guide 220. The slidable radial bearing assembly 216 may comprise a unitary device such as a spherical plane radial bearing which is readily available from the Torrington Company.

The level 214 comprises an engaging portion 222, a shaft 224, a tooling ball 226 fixed to the shaft 224, and a restraining lip 225 fixed to the engaging portion 222. The lever 214 is slidably engageable with the slidable radial bearing assembly 216 such that the level 214 may be removed from the hole angularity gauge 100 and the probe 116 replaced with probes of differing sizes to accommodate differing sized holes. The restraining lip 225 prevents the lever from passing through the slidable radial bearing assembly 216 and thereby acts to position the lever within the linkage assembly 212.

When the lever is thus positioned within the slidable radial bearing assembly 216, the lever 214 will pivot about a pivot point which is the same as the pivot point of the slidable radial bearing assembly 216. Accordingly, the shaft and the tooling ball 226 will be able to undergo unrestricted angular movement within a limited range, wherein the range is limited by the motion of the pointer 114, as will be described in more detail below. Within this range, the lever 214 can move in any plane that passes through its pivot point.

The linkage assembly 212 further includes a fixed radial bearing assembly 227 which, like slidable radial bearing assembly 216, may comprise a hollow bearing 228 pivotally mounted within a bearing guide 229. The fixed radial bearing assembly 227 is fixedly mounted within the linkage receiving portion 208 of the body inner channel 204 such that the assembly 227 abuts the abutting lip 210. The fixed radial bearing assembly 227 may be fixed within the linkage receiving portion 208 of the inner channel 204 by any known means. In the presently preferred embodiment the assembly 227 is press-fit within the linkage receiving portion 208 of the inner channel 204.

The pointer 114 is coupled to the linkage assembly 212 via the fixed radial bearing assembly 227. The pointer 114 has a conical portion 230 and a bearing engaging portion 232 which are joined to form an abutting edge 231. In the presently preferred embodiment, the bearing engaging portion 232 of the pointer 114 is press-fit to the fixed radial bearing assembly 227 such that the abutting edge 233 engages the hollow bearing 228 to thereby position the pointer within the fixed radial bearing assembly 227. Positioned within the fixed radial bearing assembly 227, the pointer 114 will pivot about a pivot point which the same as the pivot point of the fixed radial bearing assembly 227.

Like the shaft 224 and tooling ball 226 of the lever 214, the pointer 114 will be able to undergo unrestricted radial movement within a limited range, wherein the range is limited by the contact point of the pointer 112 with the fixed radial bearing assembly 227. Within this limited range, the pointer can move in any plane that passes through its pivot point.

The pointer 114 further includes an interior channel 233 having a conical portion 234 and a contact portion 236. The contact portion 236 is generally cylindrical and has a diameter which is slightly greater than the diameter of the tooling ball 226 so that the tooling ball 226 may be inserted within the contact portion 236 of the interior channel 233. The conical portion 234 is preferably sloped so that it does not contact the lever 214 during operation. Accordingly, any angular movement of the lever 214, will result in contact between the tooling ball 226 and the contact portion 236 of the interior channel 233 to angularly displace the pointer 114. The contact between the tooling ball 226 and the pointer 114 will be along the contact portion 236 of the interior channel 233 at a point referred to hereinafter as the contact point.

In operation, a probe 116 is selected that is sized to closely fit the bore which is to be measured. The probe 116 is coupled to the lever 214 and the lever 214 inserted within the slidable radial bearing assembly 216. The slidable radial bearing assembly 216 is then inserted into the linkage receiving portion of the inner channel 204. The base 106 is then threaded to the base receiving portion 202 of the body 102 to secure the slidable radial bearing assembly 216 within the linkage receiving portion 208 of the inner channel 204.

The probe 116 is then inserted into the hole to be measured until the feet 108 contact the surface 110, as shown in FIG. 1. If the centerline of the hole is angularly displaced from a line which is perpendicular to the surface of the hole, the probe 116 will pivot about its axis thus pivoting the shaft 224 of the lever in an opposite direction. The tooling ball 226 of the lever engages the contact portion 236 of the pointer inner channel 233 to pivot the pointer 114 about its axis. It is noted that the linkage assembly causes the angular displacement of the probe to be amplified and displaces the pointer by the amplifier angular displacement as illustrated in FIG. 2. The scale window 112 is gauged such that the displacement of the pointer 114 indicates the displacement of the probe 116.

It will be apparent to those skilled in the art that the amplification of the angular displacement of the probe 116 is function of both: the distance between the pivot point of the pointer 114 and the pivot point of the lever 214, and; the distance between the pivot point of the pointer 114 and the contact point. However, increasing the distance between the pivot points of the lever 214 and the pointer 114 results in an associated increase in the overall length of the tool, whereas the distance between the contact point and the pivot point of the pointer 114 may be either increased or decreased without increasing the overall length of the tool.

In the presently preferred embodiment, the contact point is above the pivot point of the pointer 114 while the pivot point of the lever 214 is below the pivot point of the pointer 114 such that the angular displacement of the pointer 114 is in the same direction as the displacement of the lever 214. However, the invention can be readily implemented with the contact point and the pivot point of the lever 214 both below the pivot point of the pointer 114. In the latter constructiion, the angular displacement of the pointer 114 will be in a direction opposite to the angular displacement of the lever 214.

To calibrate the hole angularity gauge 100, a spacer 238 is disposed intermediate the fixed radial bearing assembly 227 and the slidable radial bearing assembly 216. As mentioned above, the slidable radial bearing assembly 216 is slidably engageable with the linkage receiving portion 208 of the body 102 such that it may be readily removed. The spacer 238 can be replaced with a spacer having a different thickness such that the distance between the contact point and the pivot point of the pointer 114 may be either increased or decreased to alter the amplification of the angular displacement of the probe 116. More particularly, by decreasing the thickness of the spacer 238, the distance between the contact point and the pivot point of the pointer 114 is increased thereby decreasing the amplification of the angular displacement of the probe 116. Conversely, by increasing the thickness of the spacer 238, the distance between the contact point and the pivot point of the pointer 114 is decreased thereby increasing the amplification of the angular displacement of the probe 116.

Figure 3:
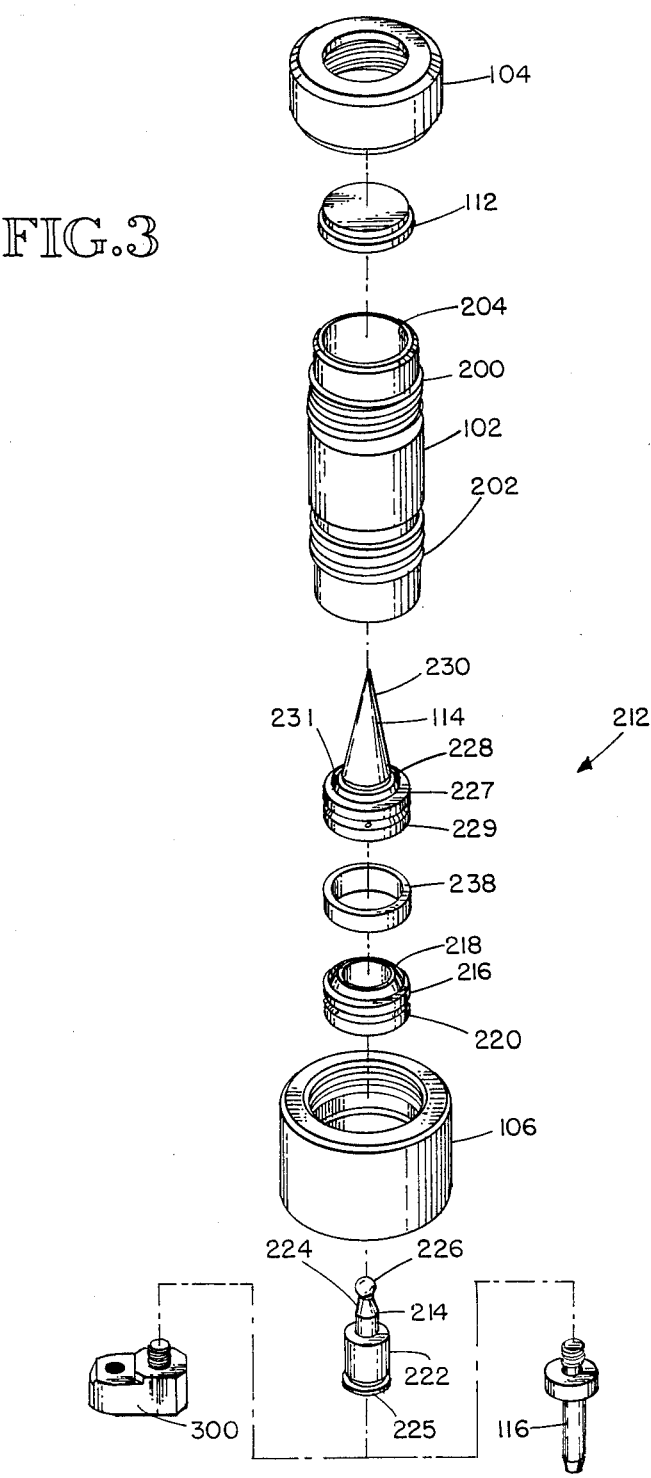
FIG. 3 is an exploded view of the subject hole angularity gauge.

The hole angularity gauge 100 may further include a dog legged coupling 300, illustrated in FIG. 3, for allowing greater access to confined areas. The dog legged coupling 300 is engaged with the lever 214 and the probe 116 engaged to the dog legged coupling 300. Any angular displacement of the probe 116 relative to a centerline which is perpendicular to the surface of the bore will angularly displace the lever 214 to allow a reading via the pointer 114 and the scale window 112.

In a still further embodiment of the invention, the base 106 includes a plurality of threaded bores 240 for receiving the feet 108. The plurality of threaded bores 240 are spaced about the periphery of the base 106 to allow the feet 108 to be inserted in any configuration. Preferably, three feet are spaced in a tripod configuration. However, it is possible with the present invention to use less than or more than three feet as desired. Further, it is possible with the present invention, by screwing the feet so that they are at varying distances from the base 106 and thereby allow hole angularity measurements of holes which have proximate protruding edges.

A hole angularity gauge as described herein has been constructed which is approximately two and one-half inches in height and which occupies a cylindrical envelope of one and three-quarter inches. The gauge is capable of measuring hole angularity accurate to one-half degree without rotation of the gauge. Further, due to the displacement of the feet 108, the gauge is capable of being used on non-flat surfaces, e.g., convex surfaces, concave surfaces, stepped surfaces, etc. The novel linkage assembly of the present invention allows the pointer 114 to undergo an angular displacement of up to 14 degrees to response to an angular displace of up to 4 degrees of the probe 116.

It will be appreciated that, although specific embodiments of the invention have been described herein for purposes of illustration, various modifications may be made without departing from the spirit and scope of the invention. Accordingly, the invention is not limited except as by the appended claims.

We claim:

1. Apparatus for measuring the perpendicularity of a bore, comprising:
    a hollow body having an inside wall, said body including a base receiving portion and an upper portion opposite said base receiving portion;
    a base mountable to said base receiving portion of said body;
    a clear scale window having a plurality of concentric circles printed thereon, each circle for indicating the angular offset of the bore centerline from an ideal centerline which is perpendicular to the plane of the surface of the bore;
    a scale retaining cap mountable to said upper portion of said body to mount said scale window to said body;
    first and second radial bearing assemblies each including a hollow bearing press fit into a bearing guide, said first radial bearing assembly being fixedly mounted within said body and said second radial bearing assembly being slidably mountable within said body and secured within said body by said base;
    a cone-shaped pointer having a conical portion, a bearing engaging portion, an abutting edge intermediate said bearing engaging portion and conical portion and an interior channel extending inward from said bearing engaging portion, said bearing engaging portion being fixed to said first radial bearing assembly such that said abutting edge engages said hollow bearing of said first radial bearing assembly to position said pointer therein whereby said pointer may undergo unrestricted radial movement within a predetermined range; and
    a lever having a bearing engaging base portion slidably mountable to said second radial bearing assembly, a retaining lip fixed to said bearing engaging base portion and engagable intermediate said base and said hollow bearing of said second radial bearing assembly to position said lever within said second radial bearing assembly, a shaft extending outward from said bearing engaging base portion and a tooling ball attached to said shaft, said second radial bearing assembly being slidable within said body such that said tooling ball extends inward of said interior channel of said pointer whereby said tooling ball contacts the walls of said interior channel, said lever also including a probe portion extending outward from said base portion in a direction opposite that of said shaft to engage the bore being measured.

2. Apparatus as recited in claim 1 further comprising a spacer sleeve slidably mountable within said body intermediate said first and second radial bearing assemblies to vary the spacing therebetween and thereby alter the angular displacement of said pointer for a predetermined angular displacement of said probe.

3. Apparatus as recited in claim 1 wherein said base includes a plurality of threaded bores, said apparatus further comprising a plurality of feet each having a surface contact portion and a threaded bolt portion, said threaded bolt portion being threadably engagable with the threaded bores of said base.

4. Apparatus as recited in claim 1 wherein said first radial bearing assembly rotates about first pivot point, said second radial bearing assembly rotates about a second pivot point and said tooling ball contacts the walls of said interior channel at a contact point and wherein said shaft is long enough so that the contact point is on an upper side of the first pivot point and the second pivot point is on a lower side of the first pivot point opposed to the upper side.

5. Apparatus as recited in claim 1 wherein said probe portion is detachable from said lever to replace said probe portion for measuring the perpendicularity of varying sized bores.

6. Apparatus as recited in claim 5 further comprising a dog legged coupling that couples the base portion of said lever to said probe portion.

7. Apparatus for measuring the perpendicularity of a bore formed in a material, comprising:
    a housing adapted to engage the material in a predetermined angular relationship with the bore;
    probe means for sensing the perpendicularity of the bore, said probe including a probe portion adapted to engage the bore being measured and a lever portion coupleable to said probe portion;
    first means for pivotally mounting said probe means to said housing so that said probe means is pivotal in substantially every direction about a first pivot point;
    pointer means for indicating the angular displacement of the bore centerline from the ideal centerline; and
    second means for pivotally mounting said pointer means to said housing so that said pointer means is pivotal in substantially every direction about a second pivot point and so that said lever portion is in contact with said pointer means at a contact point to angularly displace said pointer means in response to the angular displacement of said probe means.

8. Apparatus as recited in claim 7 further comprising means for adjusting the amplification of the angular displacement of said pointer means which results from the angular displacement of said probe means.

9. Apparatus as recited in claim 7 further comprising means for varying the distance between said contact point and the second pivot point to thereby vary the angular displacement of said pointer means in response to a predetermined angular displacement of said probe means.

10. Apparatus as recited in claim 7 wherein said first means comprises:

a first radial bearing assembly including a first hollow bearing press-fit into a first bearing guide to pivot about the first pivot point, said probe means being positionable within said first hollow bearing such that said lever portion and said probe portion pivot about the first pivot point; and means for fixedly positioning said probe means with respect to said first radial bearing assembly.

11. Apparatus as recited in claim 10 wherein said pointer means comprises:

a second radial bearing assembly including a second hollow bearing press-fit into a second bearing guide to pivot about the second pivot point, said pointer means being positionable within said second hollow bearing to pivot about the second pivot point; and means for fixedly positioning said pointer means with respect to said second radial bearing assembly.

12. Apparatus as recited in claim 11 wherein said pointer means further includes a cylindrical portion positionable within said second radial bearing assembly, said cylindrical portion including an interior channel extending from the edge thereof inward of said pointer means, said lever portion including a base portion positionable within said first radial bearing assembly, a shaft extending outward from said base portion and a tooling ball fixed to said shaft, said tooling ball extending inward of said interior channel of said pointer to contact the walls thereof such that said pointer is angularly displaced in response to the angular displacement of said lever.

13. Apparatus as recited in claim 12, further comprising spacer means for varying the distance between said first and second radial bearing assemblies to vary the distance between the contact point and the second pivot point.

14. Apparatus as recited in claim 13, further comprising a scale window having a plurality of concentric circles located thereon, said scale window being positionable substantially proximate to said pointer means to facilitate indication of the degree replacement of said probe.

15. Apparatus as recited in claim 13 wherein said probe portion is threadably coupled to said lever portion such that said probe portion may be replaced with varying sized probes.

* * * * *